UNITED STATES PATENT OFFICE.

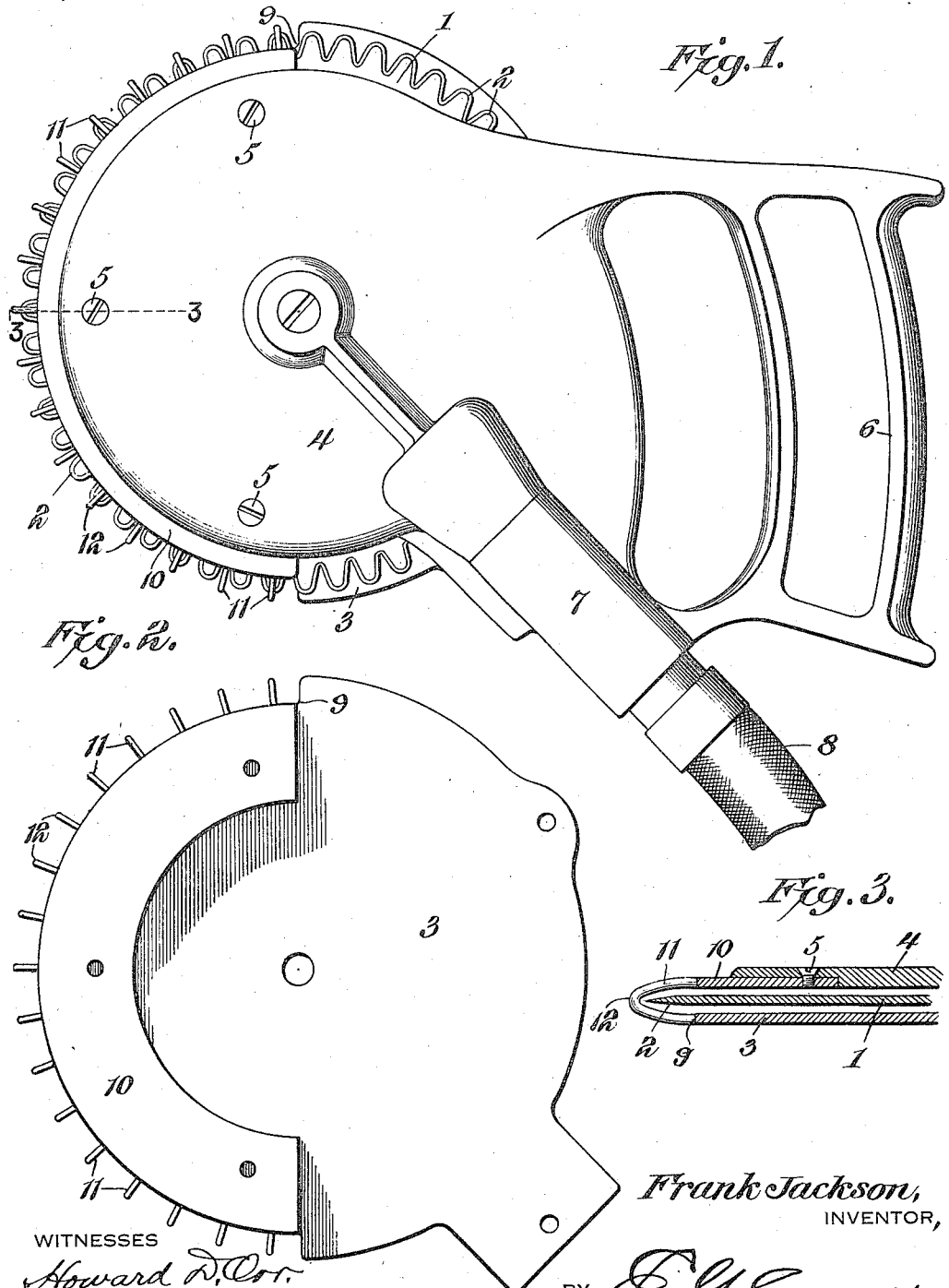

FRANK JACKSON, OF CHICAGO, ILLINOIS.

SKINNING-TOOL.

1,168,726. Specification of Letters Patent. Patented Jan. 18, 1916.

Application filed March 5, 1915. Serial No. 12,349.

*To all whom it may concern:*

Be it known that I, FRANK JACKSON, a citizen of the United States, residing at Chicago, in the county of Cook and State of Illinois, have invented certain new and useful Improvements in Skinning-Tools, of which the following is a specification.

This invention relates to skinning tools and its object is to provide a skinning tool of simple and inexpensive construction particularly designed for removing the hides from cattle without liability of the connective tissue between the hide and the flesh interfering with the action of the cutter.

The present invention is an improvement upon the skinning tool shown and described in Letters Patent No. 964,865, granted July 19, 1910. In the aforesaid Letters Patent the skinning tool comprises front and rear guards in the form of substantially circular plates with an intermediate circular rotary knife and about the peripheral portions of the guards are projections or teeth extending beyond the cutting edge of the knife. Such tool is a particularly efficient tool but is liable to become somewhat choked by the connective tissue getting between the guard plates, thus demanding the exertion of an undue amount of force to drive the tool to the work.

In accordance with the present invention the peripheral projections or teeth are joined or coalesced at their outer ends so that the knife does not become choked with the connective tissue or fell through which the skinning tool is forced.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a plan view of a skinning knife constructed in accordance with the present invention. Fig. 2 is a plan view of the guard plates for the knife with the knife omitted. Fig. 3 is a section on the line 3—3 of Fig. 1, but drawn on a larger scale.

The skinning tool comprises a circular knife 1 shown as provided with a peripheral series of radial cutting teeth 2 formed by serrating the periphery of the knife and sharpening the edges. It will be understood, however, that a plain circular knife will operate successfully and that the invention is by no means confined to any particular form of knife.

The body of the tool is in the form of a plate 3 attached to another plate 4 by screws 5 or otherwise, and the plate 4 is formed at one end into a handle 6 and between this plate 4 and the body plate 3 there is lodged mechanism for driving the knife, which mechanism forms no part of the present invention and is therefore neither shown nor described. The plate 4 has an offset elongated boss 7 through which there extend parts of the driving mechanism in turn driven by a flexible shaft 8 or in any other appropriate manner. Such parts are not shown or described in detail since they form no part of the present invention.

The body member 3 has an inset forward or active portion 9 extending part of the way about the periphery of the tool and in spaced relation to this inset portion is an arc-shaped guard plate 10 in coactive relation to the inset portion 9 which may in turn be termed a guard plate. These two guard plates 9 and 10 are of less radial extent than the knife 1, so that the cutting edges of the teeth 2 are the cutting edge of the knife, as the case may be, projects beyond the matching edges of the guard plates 9 and 10. Joining these matching edges through which the knife extends are guard loops 11, the legs of the loops joining the respective plates 9 and 10 and the yoke ends of the loops being exterior to the cutting edge or edges of the knife. These loops may be of material of rounded cross-section and the yoke ends 12 of the loops may be brought toward a point although not actually pointed.

The guard loops 11 serve to direct the skinning knife through the fell or connective tissue without any liability of the stringy-like elements of the connective tissue finding their way between the guard plates 9 and 10, so as to lie flat against the sides of the knife. With the guarded knife having guard loops 11 transversely of the plane of rotation of the knife the stringy-like particles of connective tissue are brought crosswise of the knife and are consequently cut or severed without any possibility of jamming in between the knife and the guard plates. Moreover, the guard plates 9 and 10 together with the protecting loops 11 projecting radially therefrom about the cutting edge and out of contact therewith prevent all danger of cutting, scoring or otherwise impairing the skin or hide. Furthermore, the skinning tool is particularly prevented by the guard plates and by the guard loops from damaging the appearance of the meat.

The loops serve the purpose of the projections or teeth of the structure of the aforesaid Letters Patent and also serve to prevent the connective tissue from finding its way in between the knife and the guard plates, wherefore the skinning knife always operates with the greatest ease and at no time can the connective tissue so lodge in the knife as to demand an increase of the force needed to move the knife along the hide in the operation of skinning. By making the outer or yoke ends of the guard loops rounded and the sides of the loops tapering, that is, approaching toward said yoke ends, the guards readily pierce the connective tissue without injury to either the hide or the flesh between which the tool is made to travel.

With a tool such as herein described the skinning operation may be performed in far less time than with an ordinary knife and may also be performed with greater ease and in less time than with a skinning knife of the general character of the present invention, but with the closed loops 11 omitted.

It is advantageous to make the loops 11 continuous from end to end, but they may be made by forming teeth on the peripheral portions of the plates 9 and 10 and then bringing the ends of the teeth together and soldering or otherwise uniting them. Again, the loops 11 may be separately formed and suitably connected to and connect the plates 9 and 10 at intervals about their peripheral portions.

What is claimed is:—

1. A skinning tool provided with a rotary knife with a pair of spaced guards receiving the knife between them and having the peripheral portions connected by loops constituting teeth closed at their outer ends about the cutting edge of the knife, said loops being sufficiently short to permit the knife to freely engage and sever the tissue connecting the hide with the flesh when the said loops are embedded in the tissue.

2. A skinning tool including a thin flat rotary blade and spaced guards consisting of flat plates arranged in parallelism and receiving the knife between them, said guards being joined at their outer edges by circumferentially spaced radially projecting loops having their closed ends outward and said loops being in spaced relation to the cutting edge of the knife and projecting beyond the same, whereby the knife is prevented from coming in contact with the skin or hide and the connective tissue is prevented from finding lodgment between the knife and the guard plates.

3. A skinning toll provided with a rotary knife and inner and outer guards in parallel spaced relation to each other and to the knife with the knife located between them, said guards having their outer edges joined at spaced points by loops closed at the outer ends, and said loops being of rounded cross-section and tapering toward the outer or closed ends and said loops also being in spaced relation to the cutting edge of the knife.

In testimony whereof I have affixed my signature in presence of two witnesses.

FRANK JACKSON.

Witnesses:
DAVID R. WAGNER,
EDITH L. BROWN.